(12) United States Patent
Marchini et al.

(10) Patent No.: US 8,306,904 B1
(45) Date of Patent: *Nov. 6, 2012

(54) SYSTEMS AND METHODS RELATED TO LIQUIDITY AGGREGATION

(75) Inventors: Stephen Marchini, Larchmont, NY (US); Henri Waelbroeck, Scarsdale, NY (US); Fred J. Federspiel, Larchmont, NY (US); Howard Engelhart, Hoboken, NJ (US)

(73) Assignee: ITG Software Solution, Inc., Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/114,822

(22) Filed: May 24, 2011

Related U.S. Application Data

(60) Continuation-in-part of application No. 12/975,628, filed on Dec. 22, 2010, which is a continuation of application No. 12/181,028, filed on Jul. 28, 2008, now Pat. No. 7,882,015, application No. 13/114,822, which is a continuation-in-part of application No. 12/692,147, filed on Jan. 22, 2010, which is a continuation of application No. 10/603,100, filed on Jun. 24, 2003, now Pat. No. 7,685,052, application No. 13/114,822, which is a continuation-in-part of application No. 12/219,161, filed on Jul. 17, 2008, now Pat. No. 8,041,628, which is a division of application No. 09/870,845, filed on May 31, 2001, now Pat. No. 7,428,506.

(60) Provisional application No. 61/347,676, filed on May 24, 2010, provisional application No. 61/347,682, filed on May 24, 2010, provisional application No. 60/962,307, filed on Jul. 26, 2007, provisional application No. 60/981,242, filed on Oct. 19, 2007, provisional application No. 61/032,623, filed on Feb. 29, 2008, provisional application No. 61/043,172, filed on Apr. 8, 2008.

(51) Int. Cl.
*G06Q 40/00* (2006.01)
(52) U.S. Cl. .......................................... 705/37; 705/38
(58) Field of Classification Search ............... 705/35–40
See application file for complete search history.

(56) References Cited

U.S. PATENT DOCUMENTS

| | | | | |
|---|---|---|---|---|
| 5,689,652 A | * | 11/1997 | Lupien et al. ................... | 705/37 |
| 2003/0004859 A1 | * | 1/2003 | Shaw et al. ..................... | 705/37 |

* cited by examiner

*Primary Examiner* — Thu Thao Havan
(74) *Attorney, Agent, or Firm* — Rothwell, Figg, Ernst & Manbeck, P.C.

(57) ABSTRACT

One exemplary aspect comprises a method comprising: (a) receiving data indicating that one or more orders for a specific security in one or more trading systems are available for aggregation into a potential block of at least a specific size; (b) transmitting data sufficient to enable a trading interface in communication with a first trading system to display an indication of the existence of the potential block and that at least some orders in the block originated from a second trading system in the one or more trading systems, the second trading system being separate from the first trading system; and (c) receiving from the trading interface a contra order in the first trading system that crosses the potential block. Other aspects comprise related computer system, components, and software.

10 Claims, 2 Drawing Sheets

SYSTEMS AND METHODS RELATED TO LIQUIDITY AGGREGATION

CROSS-REFERENCE TO RELATED APPLICATIONS

The present application claims the benefit of U.S. Provisional Patent Applications Nos. 61/347,676 and 61/347,682, both filed May 24, 2010, and is a continuation-in-part of U.S. patent application Ser. No. 12/975,628, filed Dec. 22, 2010, which is a continuation of U.S. patent application Ser. No. 12/181,028, filed Jul. 28, 2008 (now U.S. Pat. No. 7,882,015) (which claims priority to U.S. Provisional Patent Applications Nos. 60/962,307, filed Jul. 26, 2007; 60/981,242, filed Oct. 19, 2007; 61/032,623, filed Feb. 29, 2008; and 61/043,172, filed Apr. 8, 2008); a continuation-in-part of U.S. patent application Ser. No. 12/692,147, filed Jan. 22, 2010, which is a continuation of U.S. patent application Ser. No. 10/603,100, filed Jun. 24, 2003 (now U.S. Pat. No. 7,685,052); and a continuation-in-part of U.S. patent application Ser. No. 12/219,161, filed Jul. 17, 2008 now U.S. Pat. No. 8,041,628, which is a division of U.S. patent application Ser. No. 09/870,845 filed May 31, 2001 (now U.S. Pat. No. 7,428,506). The entire contents of each of the above-listed applications and patents are incorporated by reference in their entirety into the present disclosure.

INTRODUCTION

In public securities markets, the combination of market mechanics and trading psychology constantly creates barriers to efficient information dissemination and price discovery. The phrase "preference revelation problem" refers to the fact that a market participant's decision to reveal information about his intention to trade or his true price limits represents a tradeoff between the market impact cost of affecting price expectations and the opportunity cost of delaying or failing to execute a trade.

By way of example, the preference revelation problem may be characterized by the fact that when a market participant publicly reveals the details of a significant, active buying interest, he assumes the risk of adverse price action when other traders take his buying interest as an indication that the stock is worth more than its current price. At the same time, other market participants who had legitimate selling interests, and as well as market makers and high frequency traders seeking short term trading profits, may "fade" their offers (become less aggressive sellers), resulting in an increase in the market price.

Furthermore, there is also an empirically demonstrable risk of adverse price action due to "front running": buying activity by other market participants in anticipation of price movement resulting from a large revealed order, and all because the market participant signaled his intention to buy. But if a market participant chooses not to buy or to reveal his intention to buy in order to avoid this potential impact, he could also miss the opportunity to complete his trade, thereby taking on the opportunity cost of the missed trade or a trade that failed to execute on time.

To put it another way, when a market participant displays his true price limit—for example, his buy limit- to one or more prospective sellers, he is in effect writing an option that a seller may freely elect to execute. As long as this option is open, it sets a lower bound on the market participant's expectations of what the fair trade price should be. Even if one of the sellers originally had a lower price expectation, this expectation is immediately changed when the buyer's price limit is known; the only remaining question is whether the fair price should be even higher. Indeed, by disclosing a high price the buyer indicates an eagerness to acquire the stock, which may reflect information that has yet to come to the seller's attention. In the past, institutions have often turned to broker-dealers (also known as the "sell-side") to cope with this problem. Broker-dealers may address the challenge of preference revelation by carefully managing expectations of parties on both sides of a trade until a fair price has been discovered, and then proposing a fair trade price that can be satisfactory to both. Brokers may receive crossing orders on the buy and sell sides, and find themselves in the position of having to choose a fair price to execute the crossed trade, somewhere between the limits of the two orders. Discretion is normally used when handling such a situation, but human intermediation comes at a steep price, both in terms of commissions paid and in terms of information leakage to individuals who have close relationships with aggressive trading firms such as hedge funds.

One alternative to displaying a large block order or using a broker-dealer to source contra liquidity is the use of various algorithmic trading tools to "slice and dice" larger orders into a large number of small pieces that can be worked individually. But if the algorithms used are not deployed in a manner designed to minimize market impact and avoid leaving a "footprint" (as in the algorithmic trading engine taught in U.S. Pat. No. 7,908,203), this series of small orders inevitably reveals the existence of the larger order to both traders and trading programs (e.g., hedge funds, market makers and high frequency traders) who are skilled in the art of statistical analysis. Such traders develop and optimize trading strategies that deliberately detect large confidential orders as they are being worked in smaller pieces, and generate profits by anticipating the market impact that those orders are likely to cause.

In addition to the preference revelation problem, another problem facing institutional traders is the "buyer's remorse problem." Buyers remorse may be described as the tendency, when purchasing a fungible item, to assume that it was likely too good a deal for the other party when the deal is closed with greater ease than expected. In the context of equity trading, this problem surfaces when a large block order is filled in its entirety and the trader assumes that the contra party's order was even larger than the amount executed, that there will be residual shares after the trade is complete, and that these residual shares will subsequently have an adverse affect on the price of the security as it gets worked in the marketplace. This problem is particularly acute for a system that caters to large institutions who may be inclined to second guess the quality of an execution that happens too easily.

In a effort to address the preference revelation problem and the issue of institutional buyer's remorse, one or more of the inventors associated with the present invention (along with others) have taught various processes, methods, and systems, and improvements thereon, in prior patents and patent applications, including U.S. Pat. Nos. 7,685,052; 7,565,313; 7,778,919; 7,882,015; and 7,877,318. The discussion below is for general informational purposes only, and is not intended to be a summary of the inventions described in the listed patents, a commentary on the scope of those inventions or the claims of the patents, or to otherwise limit the scope of the patents and/or their claims.

U.S. Pat. No. 7,685,052 teaches a block trading marketplace specifically designed to address the preference revelation problem and institutional buyer's remorse. More specifically, the '052 patent teaches a block trading facility designed for institutional traders which uses anonymous, side-less, and size-less indications of order activity to focus liquidity in a given security without revealing enough information to cause market impact. Additionally, these same anonymous, side-less, and size-less indications of order activity may also be used to notify traders with "aggressively priced" orders of "near matches" with passively priced orders in the system; thereby both protecting and rewarding traders willing to express their true limit and solving the preference revelation problem by creating a trading platform where expressing an interest to trade attracts liquidity without automatically causing informational market impact or writing an option for a contra party.

The '052 patent also teaches a solution to the buyer's remorse problem by requiring all traders to enter orders only in multiples of a "large block quantity" or "LBQ." This LBQ is defined as a quantity somewhat larger than the typical size of orders usually sent to broker-dealers. For the most liquid securities, for example, the system can be configured to use a large block quantity of 100,000 shares, with smaller increments for less liquid securities (for example, 25,000 and 10,000 shares). By setting such specific order size limits/increments, the trading platform eliminates the element of surprise when an order executes in a large block unit. As a result, when a trader receives a complete fill on a 100,000 share order, he is not inclined to believe that he received an execution that was "too easy." Instead, he will assume that the fill and its size is only a reflection of the system's mandated large block size.

While an embodiment of the system described in the '052 patent was a commercial success from its launch, improvements were made to the system through the systems and methods taught in U.S. Pat. Nos. 7,565,313, 7,778,919 and 7,882,015. All three of these later patents teach variations on an improvement to the '052 system, an improvement referred to below as "contra targeting."

One purpose of the contra targeting improvement to the '052 block marketplace with anonymous, side-less and size-less indications of order activity to focus liquidity was to increase fill-rates for users on the system by allowing traders to expose some portion or the full contents of the orders in their order management systems (OMS) without sacrificing the security of this highly confidential (and valuable) trade information. (The term "OMS" is used generically herein to refer to Order Management Systems, Execution Management Systems or any other system for managing the submission, execution and/or clearing of trade orders as known in the art.) This secure OMS exposure, also known as "contra targeting," was provided by a process whereby upon receipt of a qualified order, the block trading platform would send an order query in the form of an encrypted message containing a firm, executable order to an application on the desktop (a "client GUI") of users who had elected to allow the system to search their OMS for potential contra orders.

In the instances when the client GUI found a match in an OMS in response to one of these encrypted queries, it would present the user whose OMS has been searched with a variation on an '052 patent's active symbol notification along with an option to enter a firm, auto-executable order in response to the query. As a result, the contra targeting process succeeded in creating a decentralized marketplace for order execution, ensuring that: (1) the centralized block marketplace never "knows" what is contained within a user's OMS; and (2) users of the system are not required to send confidential trading information from their OMS to the centralized block marketplace in order to expose their liquidity in their OMS to the orders resident in the system.

The systems taught by the '313, '919 and '015 patents have all been commercially successful improvements to the '052 system. However, the past several years have seen a massive explosion in the percentage of trades represented by "high frequency" trading, in addition to automation of the derivative markets and a marked expansion in the role of liquidity providers ("LP"s) within dark and block pools. Together, these changes in the trading landscape have forced the institutional block marketplace to expand its offerings to incorporate these new sources of liquidity in a way that both serves and protects institutional traders.

High-frequency trading, or HFT, may be defined as the execution of computerized trading strategies characterized by brief position-holding periods, designed in many cases to take advantage of microstructure inefficiencies. In a typical high-frequency trading, programs analyze market data to capture trading opportunities that may open up for only a fraction of a second to several hours. And because high frequency traders are only trying to capture a fraction of a penny per share or currency unit on every trade, they move in and out of their positions several times each day, aiming to amass profit through sheer trade volume rather than any kind of strategic or long term positioning.

In fact most high frequency trading firms do not accumulate positions and typically liquidate their entire portfolios on a daily basis. As a result, high frequency traders have brought a lot of liquidity to the markets. However this "new liquidity" is in many ways a double-edged sword for institutional traders in that the goals, strategies and motivations driving the high frequency traders are by no means aligned with the goals, strategies and motivations of institutional traders.

What is missing from the current electronic trading landscape and the systems described above is a system that enables institutional traders to source block liquidity from non-institutional sources, including but not limited to high frequency trades and the derivatives market, in a secure manner that protects the kind of order information that high frequency and other non-institutional traders are looking to exploit in a manner that helps to reduce, rather than increase, transaction costs.

At least one aspect (certain embodiments are referred to herein as "Liquidity Builder") of the novel systems and methods described herein addresses this need by combining the systems and methods of an anonymous, notification-driven block market of institutional liquidity (see, for example, U.S. Pat. No. 7,685,052) with a novel block aggregation manager capable of accessing and/or aggregating the displayed and dark high frequency and non-institutional small order liquidity in the cash equities and derivatives markets for the purpose of allowing institutional traders to source block liquidity from this non-institutional liquidity in an environment designed to protect against predatory trading strategies, market impact and information leakage.

Other exemplary embodiments may also incorporate the systems and methods of targeted dissemination (see, for example, U.S. Pat. No. 7,356,500) and contra targeting (see, for example, U.S. Pat. Nos. 7,565,313; 7,778,919; and 7,882,015), as well as the use of a liquidity-sourcing third party that is contractually bound in how it uses the system's information (see, for example, U.S. Pat. No. 7,877,318), in order to leverage OMS order information and/or information about trade history and trade behavior to increase the frequency with which institutional users can exploit this non-institutional liquidity.

In one or more exemplary embodiments, a Liquidity Builder system offers institutional traders at least two methods for accessing non-institutional (for example, but not limited to, high frequency, derivative and LP) liquidity: one method that enables the institutional trader to activate a Liquidity Builder search for non-institutional contra liquidity through an initiating block order, and a second method that allows a Liquidity Builder system to proactively identify and/or source a block order that is then presented to the institutional trader in the form of a notification which identifies that at least a portion of the contra liquidity or potential contra liquidity is non-institutional, and gives the institutional trader the option to execute or decline the non-institutional liquidity. Each of these methods and related systems may comprise system based and/or user based parameter settings that may be altered to enable automatic executions between the institutional orders and the non-institutional liquidity in various scenarios (or all scenarios) and/or to enable confirmation steps before executions between institutional and non-institutional liquidity in various scenarios (or all scenarios).

In one or more exemplary embodiments comprising a method and system whereby the liquidity builder system proactively identifies and/or sources non-institutional block liquidity, the liquidity builder may monitor equity and derivative market data to detect the existence of significant liquidity. Once a block aggregation manager determines that it can aggregate a block in a symbol, it may submit a special block aggregator order to a block execution facility. This special block aggregator order may be identified within the system as non-institutional liquidity to ensure that when traders are offered the option to execute against this liquidity, they can be notified as to its non-institutional origin.

Alternatively the block aggregation manager may predict that a block could be assembled and instead of submitting a special block aggregator order may send a special block aggregator indication to the block execution facility. This block aggregator indication may be identified within the system as a non-institutional indication, to ensure that when traders are offered the option to initiate the process whereby the liquidity builder system actually sources the liquidity represented by the indication, they are aware that this potential liquidity is non-institutional.

Once the block execution facility has received a block aggregator order or an indication, a liquidity builder notification may be sent to institutional users on the system. This notification may be similar to the active symbol or contra present notifications used in the '052 and '015 patents discussed above. However, this new type of notification is specifically designed to alert the institutional trader to the fact that the source of the liquidity (if the notification was triggered by a special block aggregator order, or if the notification was triggered by a special block aggregator indication) is non-institutional. The improvement/differentiation in the notification system of this exemplary embodiment is critical in that it both alerts institutional users to the non-institutional nature—and therefore potentially "higher risk"—of the liquidity, and also offers the option, in what was traditionally a system of automatic executions, to execute, initiate or decline non-institutional liquidity that has been identified or sourced by the liquidity builder.

Depending on the embodiment, this liquidity builder notification may be sent to all users on the system or to select users who are targeted: (a) because they requested a notification for all or some subset of liquidity builder block order notifications and/or block indication notifications; (b) because of current and/or historic trade/order information known to the system that targets a given traders as having a high potential for being interested in the liquidity builder block order or block indication; or (c) because of trade/order information detected in their order/execution management system which indicates the presence of a contra order to a particular liquidity builder block order or block indication.

In certain exemplary embodiments which improve upon the systems and methods of targeted dissemination (see, for example, U.S. Pat. No. 7,356,500) and contra targeting (see, for example, U.S. Pat. Nos. 7,565,313; 7,778,919; and 7,882,015), the block execution facility may send the notification regarding the aggregated block order/indication to buy-side users in the form of an encrypted message. The block execution facility may have a software application which then decodes the information and searches a user's OMS. If (and in at least one exemplary embodiment, only if) the user has a contra in his OMS to the block aggregator order, he learns about the aggregated block. If he does not have a contra in his OMS to the aggregated block, then the message is destroyed and the user does know that it was sent.

In one or more exemplary embodiments, the type/form/content of this "liquidity builder notification" ensures that traders are aware that the block liquidity has been sourced by non-institutional users. Then traders can either accept or decline the notification, with an acceptance leading to an execution priced at the NBBO or better.

In one exemplary embodiment, a "block aggregation manager" is a combination of software and traders. In this embodiment, there are traders managing an "aggregation manager" component who decide when and whether to submit an aggregated block order to the block execution facility. Alternately, in one or more other exemplary embodiments, all of the steps performed by the aggregation manager are automated.

Other exemplary embodiments of the subject system may also be configured to work in conjunction with graphical user interfaces and algorithmic trading engines such as, but not limited to, those described in U.S. Pat. Nos. 7,882,013 and 7,908,203, wherein an algorithmic trading engine manages the automated execution of trade orders using sophisticated tactical and strategic algorithms, and a "BlockBoard" and/or a "SwitchBoard" are used to display information about symbol and order activity.

One exemplary aspect comprises a method comprising: (a) receiving data indicating that one or more orders for a specific security in one or more trading systems are available for aggregation into a potential block of at least a specific size; (b) transmitting data sufficient to enable a trading interface in communication with a first trading system to display an indication of the existence of the potential block and that at least some orders in the block originated from a second trading system in the one or more trading systems, the second trading system being separate from the first trading system; and (c) receiving from the trading interface a contra order in the first trading system that crosses the potential block.

In various exemplary embodiments: (1) the method further comprises transmitting to the second trading system the contra order for execution against the aggregated one or more orders; and (2) the one or more trading systems seek to identify one or more orders for the specific security that are available for aggregation into the potential block in response to at least one of: (a) a timer; (b) a market data analysis indicating presence of two-sided interest in the specific security; (c) confidential information about a standing order that has not crossed with other institutional liquidity; (d) information related to trade history that indicates a potential need for block liquidity in the specific security; and (e) confidential information from one or more order management systems indicating a potential need for block liquidity in the specific security.

Another exemplary aspect comprises a method comprising: (a) receiving data indicating that one or more orders of a specific size for a specific security are available in one or more securities trading systems; (b) transmitting data sufficient to enable a trading interface in communication with a first trading system to display an indication of the existence of the one or more orders and to indicate that the at least one or more of one or more orders originated from a second trading system in the one or more trading systems, the second trading system being separate from the first trading system; and (c) receiving from the trading interface a contra order that crosses the one or more orders.

In various exemplary embodiments: (1) the method further comprises transmitting to the second trading system the contra order for execution against the one or more orders; and (2) the one or more trading systems seek to identify one or more orders of a specific size for a specific security that are available in one or more securities trading systems in response to at least one of: (a) a timer; (b) a market data analysis indicating presence of two-sided interest in the specific security; (c) confidential information about a standing order that has not crossed with other institutional liquidity; (d) information related to trade history that indicates a potential need for block liquidity in the specific security; and (e) confidential information from one or more order management systems indicating a potential need for block liquidity in the specific security.

Another exemplary aspect comprises a method comprising: (a) receiving from a trading interface for a first trading system data describing a trading interest of a specific size and side in a security; (b) notifying one or more systems, external to the first trading system, and comprising orders in the security of the trading interest, but not necessarily of the size and side; (c) receiving an indication from at least one of the external trading systems that one or more contra orders are available in the external trading systems for matching against the trading interest; (d) transmitting data sufficient to cause the trading interface to display an indication that the one or more contra orders are available for matching against the trading interest and that at least one of the one or more contra orders originated in the external trading systems; (e) receiving from the trading interface instructions to execute the trading interest against the one or more contra orders; and (f) transmitting a request to the at least one of the external trading systems to execute the trading interest against the one or more contra orders.

In an exemplary embodiment, the trading interest is a block order in the security.

Other aspects and embodiments comprise related computer systems and software, as will be understood by those skilled in the art after reviewing the present description.

DETAILED DESCRIPTION OF SELECT EXEMPLARY EMBODIMENTS

Figure 1:
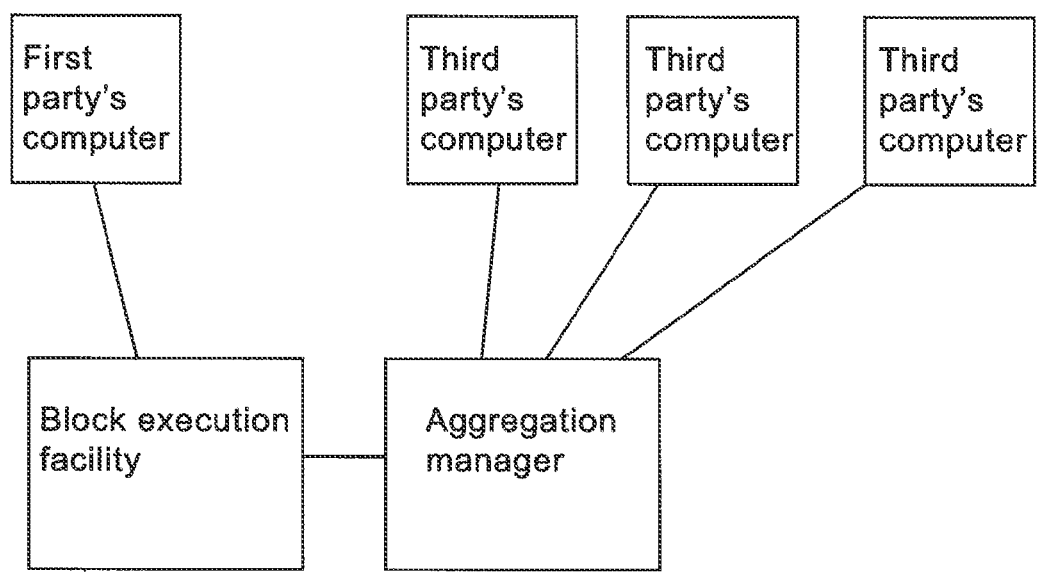
FIG. 1 depicts an exemplary block aggregation system.

In at least one exemplary embodiment, the system is in communication with a block execution facility and an aggregation manager. See FIG. 1.

A block execution facility may receive orders with an explicit or implicit minimum size requirement, match buy and sell orders, and report executed trades when matches occur that meet the minimum size of both the buy and sell orders.

In step 1 of an exemplary embodiment whereby a market participant initiates the liquidity builder system, a first participant places an order into the block execution facility using a FIX interface or other appropriate method.

In step 2, the block execution system notifies an aggregation manager electronically of the presence of the order.

In step 3, the aggregation manager sends messages to a plurality of third parties who hold books of orders containing the symbol of the security in the first order. The third parties may be algorithm operators running agency algorithms, or other sources of liquidity. Parties receiving these messages preferably are not permitted to profit from information about the existence of the underlying order. This can be ensured, for example, through contractual agreement (as taught in U.S. Pat. No. 7,877,318) or through an auditable technological process that prevents the information from being viewed by humans other than under specified conditions required to ensure operational integrity of the systems, or through a whereby discreet systems within a larger system/entity are used to receive/respond to the message and to source contra liquidity such that the system used to source the liquidity is not "aware" of the order initiating the search for liquidity thereby preventing any opportunity for the system to profit from knowledge of the initiating order.

In an exemplary embodiment, the message is encrypted and received by a software installed at the third party by the operator of the block execution facility. This software system may decode the encrypted message and query a local third-party database to identify the possible presence of executable shares in an OMS or EMS.

In step 4, the third party system may respond electronically and with minimum delay with the number of shares and side available for execution.

In step 5, the aggregation manager may sum the responses received from third party systems and determine whether the aggregate quantity suffices to meet the minimum size requirement on the first block order.

In step 6, if the minimum size requirement is met, there is either an immediate block execution between the initiating block order and the aggregated block, or the initiating user is prompted via a notification to confirm the desire to execute a cross with the sourced block liquidity.

If there is an execution, either automatic or triggered by a confirmation via the notification, in step 7 an execution is reported between the aggregated block and the first initiating block order at a price derived from current market quotes. Responding orders preferably are handled in time priority, and orders are ignored if their price limit is not sufficiently aggressive relative to the derived price. The derived price may be the market midpoint, best bid or ask, or other derived prices known in the art.

In step 8 any residual orders following the execution of the match against the first block order are considered to see if additional matching opportunities exist. These orders are considered for residual matching in time priority.

In step 9, the system sends messages to all third parties to report any executions and withdraw the requests for liquidity.

In an exemplary embodiment, third parties may be required to hold execution of the size they have committed to the aggregate match opportunity while the process takes place; this precludes them from submitting shares that they may have placed to various markets, to avoid multiple-committing the same shares.

In an exemplary embodiment, third parties may be encouraged to report both the number of shares currently uncommitted to any market place, and the number of shares that are committed to a market destination but are not currently known to be executed. In this embodiment, the aggregation manager preferably determines the possibility of an aggregate match based only on the shares known to be available, but then determines the maximum number of shares that could be executed including shares currently committed but not executed at particular market destinations.

Upon receiving the execution request, the third party proceeds to request cancels from the market destinations holding committed but not executed shares as required to maximize the number of shares that can be executed in the cross. In a variation of this alternate embodiment, the operator of the block crossing system commits the trade optimistically in anticipation that the shares will be available, and any failure to cancel the committed but not executed shares from other market destinations is processed as an error in the matching process and automatically resolved through an algorithmic wind-down process.

Another exemplary embodiment enables third parties to enter a delayed response. In this embodiment, all third party responses are held for a specified number of seconds sufficient for a human trader to respond to a popup to enter shares into an aggregation match. In this embodiment, the aggregation manager preferably determines first the number of shares that could be matched using electronic responses, and if this number exceeds the minimum these responses can be locked in while manual-response third parties are invited to participate in the residual.

In the contrary case where the electronic responses do not suffice to fill the minimum quantity on the first order, the message to manual response third parties contains the net remaining minimum size that would be required to trigger a match, and traders are only notified of the opportunity if their OMS/EMS indicates that their size is in itself sufficient to meet the minimum, when aggregated with electronic responses.

Manual responders only have access to residual liquidity in this system. Therefore this embodiment may also comprise a user interface that enables manual responders to pre-set a certain number of shares that are available for automatic execution. Should they be configured this way they would then participate electronically in the primary match and also be invited to enter a manual response for a larger size if the market conditions are appropriate.

In another exemplary embodiment, the first and second steps where a first participant places a block order and the block system triggers a request for aggregation are omitted, and the aggregation system initiates the messages to third parties automatically. The trigger for the liquidity builder system's proactive identification or sourcing of non-institutional liquidity can be, for example, but is not limited to: a timer, a market data analysis indicating the presence of two-sided interest in a given security on the market, confidential information from the block marketplace about a standing order that has not crossed with other institutional liquidity within the block marketplace, and/or information from the block marketplace related to trade history that indicates a potential need for block liquidity or confidential information from one or more order management systems indicating a potential need for block liquidity.

In an exemplary embodiment, there is no minimum quantity condition. Depending on the trigger that initiated the liquidity builder search for liquidity and the associated automatic or confirmation-only execution parameters within the liquidity builder system, the block marketplace and/or individual user preferences; the sourced liquidity may be either automatically executed against standing orders in the block marketplace or orders resident in institutional users order management systems, or matched with standing orders from the block marketplace, resident OMS orders, or user trade history in such a way as to generate a liquidity builder indication or order notification as described above.

Figure 2:
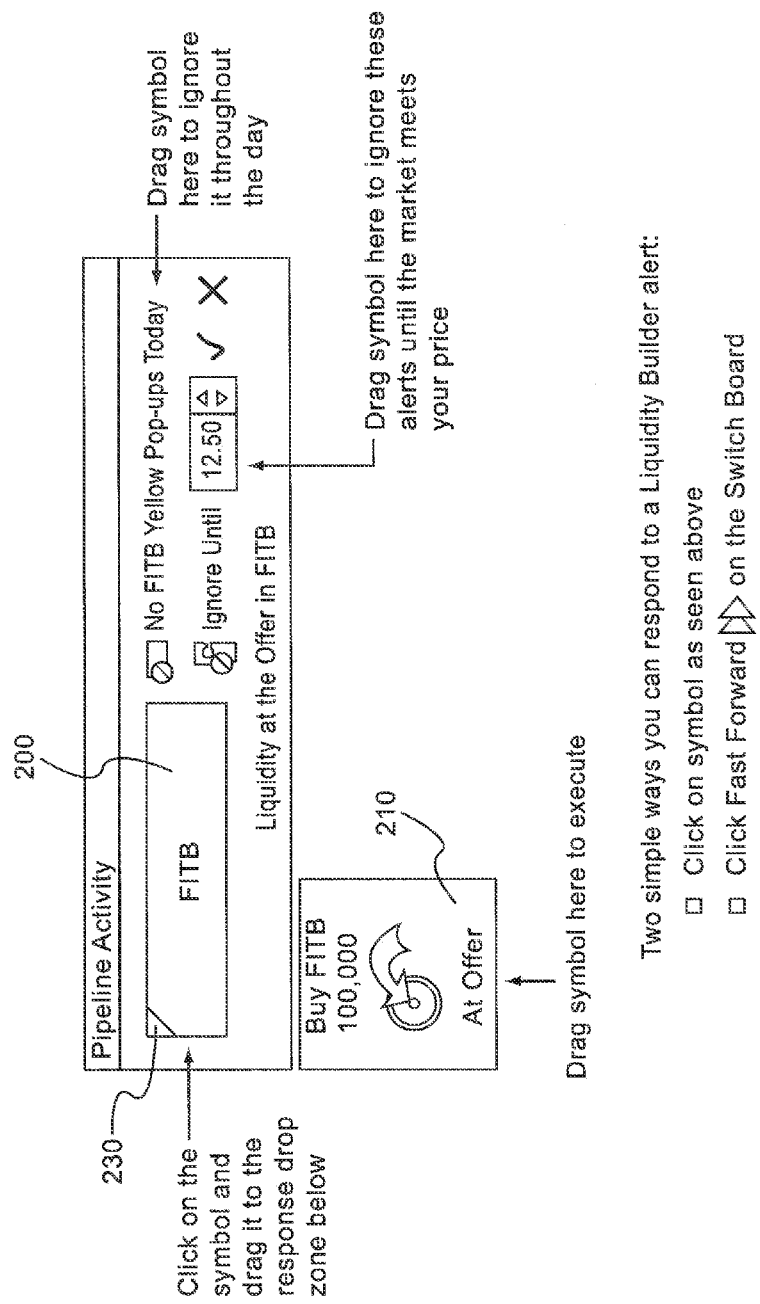
FIG. 2 depicts an exemplary liquidity aggregation display.

Referring to FIG. 2, a Liquidity Builder (LB) yellow light 200 is a notification that the system has identified sufficient high-frequency liquidity in the market to fill a block at the current NBBO. The dark triangle 230 at the upper-left corner of yellow light 200 is an exemplary type of indication that the liquidity is, for example, high-frequency (or otherwise sourced from an external system).

If the user is interested in having the block aggregated by the Liquidity Builder, he may simply click on the notification to lock in a large block trade at the NBBO or better. The block aggregation manager or an affiliate may then package small order liquidity into, for example, LBQs as taught by the '052 patent in single 10,000, 25,000, 100,000, or 250,000 share blocks of the underlying equity security according to the exemplary steps described above.

The liquidity builder feature may be made available on an opt-in basis and provides the buy-side with a way to control their interaction with high-frequency trading strategies. Because it is not "natural" block liquidity, interacting with the LB light can be considered an interaction with "higher risk" liquidity, and this is why institutional traders, in one or more exemplary embodiments, are always notified as to the non-institutional nature of the liquidity, but the option is offered to institutional traders within the block marketplace because interacting with this liquidity builder liquidity within the "confines" of the secure block marketplace is still expected to have significantly less impact than an attempt to directly cross the spread for a large block.

In one or more exemplary embodiments:
Buy side traders may be eligible to receive the LB yellow lights even without placing an order into the system.
Users see the LB yellow light based on their OMS orders and/or recently completed activity.
Users respond to the LB yellow light via a drop zone (see FIG. 2, 210) or other elements on a graphical user interface designed to allow traders to mange the execution of their orders via the block trading facility and/or its related technologies such as, but not limited to, those described in U.S. Pat. No. 7,882,013.
LB yellow lights preferably are sent in such a manner that the sender does not know whether anyone receives a yellow light.
LB lights preferably remain lit until the either the order is filled, the order is cancelled by the sender, or the market shifts.
Users preferably must be set up to receive LB yellow lights.
To maintain an agency function for the system, LB liquidity may be detected and aggregated through an affiliate. Once detected, LB liquidity opportunities may be sent by the affiliate for display to the system's qualified institutional clients. Preferably all trades on the system, including LB trades, may continue to be agency trades.
The aggregation system may continuously scan for liquidity from several sources—for example:
Displayed liquidity;
Estimated dark liquidity; and
Displayed auto-ex, close-to-the money option liquidity.
When the LB liquidity is selected by the buy-side, an affiliate may collect the requested liquidity from the sources, and convert any option exposure back into the underlying equity. The buy-side trader may receive a complete block, all in the underlying equity security, at the prevailing NBBO.

The system may reserve the right to decline any LB trade within 5 minutes.

If a user wishes to receive the LB yellow light indicating the availability of a block posted at the bid or offer and be set up to access the Liquidity, the system may configure the trader's account so that the trader's FIX Auto orders may execute against marketable orders in the system's book.

This configuration may allow the trader to take any resident liquidity in the system's book (LB or normal orders) within the bid/offer spread.

Any remaining shares following an execution may be available to auto-execute at the midpoint, and subsequent bid/offer Liquidity opportunities may generate an alert back to the trader.

Once that configuration is in place, upon seeing the yellow light, the trader's software FIXes in a "1 LBQ" order to take the LB liquidity.

Exemplary Software Embodiments

1. Introduction

"Rapid" is used interchangeably below with "Liquidity Builder," and "RL" interchangeably with "LB," to refer to an exemplary set of changes to a trading server and client to enable a Liquidity Builder Opt-In feature.

Rapid Liquidity ("RL") Providers (i.e. systems, humans or affiliates that aggregate liquidity for the Liquidity Builder) may have the ability to:

1. Submit lists of orders, passively limited to the NBBO spread (Peg Passive).
    2. Generate special (yellow) LB Alerts to system end users.
    3. Employ a throttle on executions resulting from LB Alerts.

2. Trading Server (a) Configuration i. Firm/FIX Session

These settings may be applied based on the combination of Firm and FIX Session.

I. Peg Passive Allowed—(Y/N), default=N. If (Y) allow the session to submit a Peg Passive order, if (N), Reject.

II. Rapid Liquidity Order Tag (Integer), default=0. If (>0) indicates the FIX tag to use for indicating that the received order is a Rapid Liquidity Order.

III. Rapid Liquidity Order Tag Value (String), default= [blank]. If Rapid Liquidity Order Tag is set, this value may be matched in the tag to indicate a submitted order is a Rapid Liquidity Order.

ii. Firm/Order Route

I. Disable Midpoint Protection at Entry—(Y/N), default=N. If (Y) orders received may disregard midpoint protection for its initial Match Check and act as straight Limit/Market orders. This may allow an auto-execution with a RL Order (or any other passively priced order within the spread). Midpoint protection would be applied for all subsequent match checks.

II. Cancel at Limit—(Y/N), default=N. If (Y) the server may cancel orders received via the order route if the order has a limit that is (or moves) passively outside the NBBO spread (limit<bid for a buy order/limit>offer for a sell order).

iii. Firm

These settings may be applied on a Firm basis.

I. Max Exec Window—(Integer [N], Integer [M]), default=0,0. If both values are greater than zero than if the firm receives [N] fills within [M] seconds all of their live orders may be canceled.

II. RL Enabled—(Y/N), default=Y. If (Y) the firm is enabled to Receive Rapid Liquidity Alerts.

III. RL Min Score—(Integer), default=0. Minimum score required to grant display authorization to a Rapid Liquidity alert.

IV. RL Min/Max Duration—(Integer), default=25,000. Min/Max time to display to a user receiving a RL alert. The large default essentially ensures that the alert may be displayed for the life of the order.

iv. ACT Reporting

These settings apply to the ACT reporting daemon.

I. RL Min/Max Tape Delay—(Integer), default=0. Random min/max number of seconds to delay a tape report for a trade generated from a Rapid Liquidity match.

v. System Activity Reporting

These settings apply to the System Activity Daemon (sacd)

I. RL Min/Max Block Tape Delay—(Integer), default=0. Random min/max range of seconds to delay a Block Tape (blue light) report for a cross involving an RL order.

(b) Passive Pegged Order Type

The Trading server may accept FIX orders designated as Peg Passive.

Peg Passive buy orders may be dynamically pegged to the NBBO Bid.

i. Peg Passive sell orders may be dynamically pegged to the NBBO Offer.

ii. Traders may also be able to specify a Limit with the Peg.

iii. When the Limit Price is not the same as the dynamic Passive Peg price (Bid/Offer) the system may limit the order based on the less aggressive of the two prices.

(c) LB Indicator/Alerts

The existence of Rapid Liquidity Orders may be communicated to System customers.

i. System may use the existing Contra Targeting infrastructure such as, but not limited to, those described in U.S. Pat. Nos. 7,565,313 and 7,882,015 to deliver LB Alerts.

ii. In order to generate an alert, the Liquidity Provider order must have a hard limit within or more aggressive than the NBBO spread and leaves >=1xSystem Minimum.

iii. The trading server may assemble a list of possible recipients (based on configured RL Enabled) for the LB Alert.

iv. The Contra Target Request message may be updated to include a new field indicating that the CT Request is for a LB Provider.

v. The Contra Target Request message pricing field may contain the current Bid for a CT Sending Buyer/Offer for a CT Sending Seller.

vi. A new CT reason code may be introduced in order to ensure that the GUI considers all order types for LB qualification. The new LB reason may be "LB=5'. The data warehouse should be able to handle this value when mining RL activity. See the GUI section for scoring.

vii. The Ranking Service may grant display authorization of the score submitted on a display request from the GUI is greater than or equal to RL Min Score for the firm.

viii. The Rapid Liquidity CT may be revoked when

I. The Rapid Order's hard limit moves outside the spread.

II. The Rapid Order is filled below the System Block Minimum.

III. The Rapid Order is canceled.

IV. The GUI times out on the RL Display Duration, as set by RL Min/Max duration. This should normally be set to a large number to ensure the alert is displayed for the life of the RL sending Order.
ix. Once revoked, a RL CT may NOT be re-sent.
x. The current Bid/Offer should be sent to the GUI on Contra Present messages. This may assist with the GUI implementation for Ignoring CP/RL alerts by price.
xi. The Trading Server may filter GUI versions when sending RL Contra Target Requests to ensure recipients are using a RL enabled front-end.

(d) Cancel at Limit
i. If an order is received via an Order Route with the configurable Cancel at Limit set to Y, their order must remain tradable to remain open in System.
   I. If the order is to BUY, its limit must be greater than or equal to the BID.
   II. If the order is to SELL or SHORT, its limit must be less than or equal to the OFFER.
ii. When the order is no longer tradable it may be canceled by the server.

(e) RL Response Orders and Midpoint Protection in the Match Engine
The normal logic for Midpoint protecting customer Market Orders must be bypassed with regards to Rapid Liquidity Response Orders.
i. Midpoint protection should be bypassed when the Match Check is precipitated by the arrival of a RL Response Order (IOC from GUI), or if the trader has Disable Midpoint Protection at Entry set to Yes.
ii. The System Match Check Logic may be updated as follows:
   I. If the Match Check is triggered by the arrival of an Order
      a. With a limit (if any) for a buy is at least as aggressive as the offer, or for a sell, the bid, AND
      b. That has arrived via a Firm Order Route with Disable Midpoint Protection at Entry=Yes, OR
      c. Has arrived via a Bulls-Eye from the GUI
   II. Execute the Match at the limit of the passive resident order, for example the bid for a buyer matching a new seller, or the offer for a passive seller matching a responding buyer.
iii. Midpoint protection may be left intact for all other match checks (apart from CP matches).
iv. NOTE: Unlike Contra Target senders, Orders generating RL Alerts have no special impact on Time Priority. A RL Order may execute behind another passively priced resident order submitted earlier, even if the aggressive responder was triggered by the RL Alert.
v. The GUI may forward the CT RequestID which generated the RL alert on any orders submitted while the Alert is displayed. This ID may be captured and stored in the Order Summary database.

(f) Rapid Liquidity Provider Execution Limit
Rapid Liquidity Providers may have the option of controlling their auto-execution exposure within System.
i. If the firm has set and reached its Max Exec Window
   I. An alarm may be generated at the LOGUSER level: "RL Provider [FIRM_NAME] has reached their Max Exec Limit [Max Exec Window fills, seconds], cancelling all orders.
   II. All outstanding orders from the Firm may be canceled.
   III. The running fill count for the current Exec Window may be reset to 0.

(g) Delayed Tape Reporting
The server may hold Rapid Order prints up to the longest possible time allowed by regulation.
i. Executions resulting from a Rapid Order trade may not be reported to ACT immediately.
ii. The ACT reporting engine may evaluate the pending trade report once a second.
iii. The trade may be reported when either of the following conditions are met:
   I. The market has moved such that the component of the NBBO used to set the execution price has changed. For example, if the match is between a RL buy and a response seller, the match was done at the NBBO bid. As soon as the NBBO bid changes, we can print the trade.
   II. RL Min/Max Tape Delay (90) seconds have elapsed since the execution occurred.
iv. The timestamp reported on the trade report may be the actual time of the trade.
v. If one side of the trade is clearing via an A2 agreement, the A2 report may also be delayed until the time of the Tape Report.

(h) Delayed Block Tape Reporting
The server may delay the Block Tape (blue light) message sent to GUIs for crosses involving a RL Order.
i. When a block cross occurs where one side is a RL Order, the system activity daemon may calculate a delay using the configurable RL Min/Max Block Tape Delay settings.
ii. When the calculated delay expires the Block Tape message may be transmitted to the GUIs.

(i) Recovery
i. If the ACT reporting daemon goes off line, unreported pending trades may need to be recovered and reported to ACT and the Block Tape.

3. Help Desk
FIX Configuration
The Firm/FIX configuration settings may be updated to include access to the Rapid Liquidity related settings.
i. Peg Passive Allowed
ii. Rapid Liquidity Order Tag
iii. Rapid Liquidity Order Tag Value
(b) Firm Configuration
i. Rapid Liquidity Max Cash Imbalance
ii. RL Enabled
Trade Scans
iii. The trade scan interfaces may need to have the ability to display the Passive Peg price type on orders.
iv. Trade scan interface should be able to distinguish Rapid iquidity Provider orders.

4. GUI
Rapid Liquidity Alert
i. The GUI may process the additional fields on a Contra Target Request to determine whether or not the CT Request for a normal Contra Flash, or a Rapid Flash.
ii. The GUI may perform the same scoring exercise and display authorization requests associated with normal Contra Targeting. A new CT reason may be introduced—RapidLiquidity=5. When a RL request comes down from the server with CTReason=5, then the GUI may include all blotters that match symbol/side on the CTRequest, and give them a base score of 1. This may allow largest segment of System users to see RL alerts.
   I. If any CT reason other than RapidLiquidity (5) is sent from the server, then normal CT scoring exercises may be performed.

iii. If the GUI is authorized to display the Rapid Flash, it may be shown as a Yellow Light.
(b) Rapid Liquidity Response
 i. A trader responding to a Rapid Liquidity Alert may have the opportunity to use the Bulls-Eye drop-zone.
 ii. The Immediate Or Cancel (IOC) order generated by the Bulls-Eye should replace Midpoint with Market for pricing.
 iii. Orders submitted to the server via New Bulls Eye/Drag and Drop Bulls-Eye may be marked as a RL Response Order.
 iv. The CT RequestID may be submitted along with the Order if sent while displaying an RL Alert.
(c) Rapid Liquidity Ignore
The functionality that allows a trade to ignore contra target notifications (CT Ignore) may also be extended to cover Rapid Liquidity Alerts such that traders may have the option to Ignore RL Alerts to a given price, or for the rest of the day. However, unlike CT Ignore, ignoring a RL Alert may NOT result in a suppression of the Orange Light for the underlying security.
 i. Ignoring a RL Alert MAY result in a suppression of ALL Yellow Lights for the underlying security while the RL Ignore is in force.
 ii. To enable proper functionality of RL Ignore with CP orders, the current Bid/Offer should be sent to the GUI on Contra Present messages.
(d) Default Response Quantity
 i. In one embodiment the default response quantity presented to the user via the Graphical User Interface (GUI) may be all System-eligible quantity.
 ii. In other exemplary embodiments, the default response quantity presented to the user via the GUI may be 1 LBQ.
5. Data Warehouse
Identifying Rapid Activity
 i. Rapid Liquidity Providers may need to be identified in the data warehouse.
 ii. Orders may have to be recorded with a Rapid Activity flag to indicate that they were either initiating or responding to Rapid Activity.
 iii. Executions resulting from a Rapid Activity match may need to be identified as such.
 iv. A new CT reason code may be introduced in order to ensure that the GUI considers all order types for RL qualification. The new RL reason may be "RapidLiquidity=5". The data warehouse should be able to handle this value when mining RL activity. See the GUI section for scoring.
Exemplary Configuration
 v. Trader Accounts
RLP Configuration
Peg Passive Enabled=T
RLP Order Tag=18 (Exec Instructions)
RLP Order Value=R (Primary Peg)
Cancel @ Limit=True
Default CT Level=Level 3

| Buy-Side Trader A Configuration | Buy-Side Trader B Configuration |
|---|---|
| CT Enabled = True | CT Enabled = True |
| RL Enabled = True | RL Enabled = True |
| RL Min Score = 0.1 | RL Min Score = 0.1 |
| CT Min Score = 6 | CT Min Score = 6 |
| RL Min/Max Duration = 25000, | RL Min/Max Duration = 25000, |

| Buy-Side Trader A Configuration | Buy-Side Trader B Configuration |
|---|---|
| 25000 | 25000 |
| Disable Midpoint Protection = False | Disable Midpoint Protection = True |
| Configure for Full Integration | Configure for Hybrid Integration |

| Buy-Side Trader C Configuration | Buy-Side Trader D Configuration |
|---|---|
| CT Enabled = True | CT Enabled = False |
| RL Enabled = False | RL Enabled = True |
| CT Min Score = 6 | CT Min Score = 6 |
| Disable Midpoint Protection = False | Disable Midpoint Protection = False |
| Configure for Full Integration | Configure for Hybrid | vi. Buy-Side Blotters

TABLE 1

| Trader | Symbol | Side | Qty |
|---|---|---|---|
| Trader A | MSFT | B | 500K |
| Trader B | MSFT | B | 500K |
| Trader C | MSFT | B | 500K |
| Trader D | MSFT | B | 500K |

(b) Test Cases
 i. Case 1—Detect RLP Order
* Tests systems ability to recognize a RLP order and generate alerts
RLP Submits S 100K MSFT @ Peg Primary
Trader A, B, D receive RL Alert
RLP Cancels
Alert disappears for Traders A, B, D
 ii. Case 2—Detect non-RLP Order
* Tests systems ability to recognize a RLP order and generate alerts
RLP Submits S 100K MSFT @ Midpoint
Trader A, B, C receive CT Alert
RLP Cancels
CT Alert disappears for Trader A, B, D
 iii. Case 3—Alert Priority
* Tests a user receiving a CT+RL order on same symbol
RLP Submits S 100K MSFT @ Midpoint
Trader A, B, C receive CT Alert
Right away, RLP Submits S 100K MSFT @ Peg Primary
Trader A, B, D receive RL Alert
RLP Cancels both orders
 iv. Case 4—Min Score difference
* Trader B does not qualify for CT, but does qualify for RL
Trader A submits B 100K MSFT @ Market
Seller submits S 100K MSFT @ Market
Trader A executes with Seller
Seller submits S 100K MSFT @ Market, CT Level=1 (RA)
Trader A (only) receives CT Alert
RLP Submits S 100K MSFT @ Peg Primary
Trader A, B, D receive RL Alert
 v. Case 5—RL Response Hybrid, with disable midpoint match enabled
* Trader B responds to RL via FIX and executes immediately
RLP Submits S 100K MSFT @ Peg Primary
Trader A, B, D receive RL Alert
Trader B responds from OMS via FIX with 100K @ Market
Trader B executions with RLP for 100K.
RL Alert disappears vi. Case 6—RL Response Hybrid, with disable midpoint match disabled
* Trader D responds to RL via FIX and receives second CP alert.
RLP Submits S 100K MSFT @ Peg Primary
Trader A, B, D receive RL Alert
Trader D responds from OMS via FIX with 100K @ Market
Trader D receives a second RL alert pop-up
Trader D drags this to bulls-eye and executes.

vii. Case 7—Entering order and NOT auto-executing with an RL
* Trader A puts an order in while seeing an RL alert, but does not auto-ex at the market.
RLP Submits S 100K MSFT @ Peg Primary
Trader A, B, D receive RL Alert
Trader A submits B 100K MSFT @ Market—Blocks Only (does not use bulls-eye)
Trader A's order is entered, does not auto-ex.
Trader A receives second CP Alert (due to RLP's standing order).
Submit S 100K MSFT @ Market from another seller.
Other Seller should auto-ex with Trader A @ Midpoint.

viii. Case 8—Disable Midpoint Protection @ Entry only applied @ Entry
* Trader B should NOT auto execute with RLP.
Trader B submits order B 100K MSFT @ MArket
RLP Submits S 100K MSFT @ Peg Primary
Trader A, B, D receive RL Alert
Trader B does NOT auto-ex.
Trader B cancels order from FIX.
Trader B re-submits B 100K MSFT @ Market
Trader B auto-executes with RLP for 100K Numerous alternatives, modifications, and variations of the exemplary embodiments described herein will be apparent to those skilled in the art in light of the foregoing description. The exemplary embodiments described herein are shown only for the purpose of illustration and not for the purpose of limitation. The scope of the invention is intended to be limited only by the issued claims.

We claim:

1. A method comprising:
   receiving with a processing system comprising one or more processors data indicating that one or more orders for a specific security in one or more trading systems are available for aggregation into a potential block of at least a specific size;
   transmitting with said processing system data sufficient to enable a trading interface in communication with a first trading system to display an indication of the existence of said potential block and that at least some orders in said block originated from a second trading system in said one or more trading systems, said second trading system being separate from said first trading system; and
   receiving from said trading interface a contra order in said first trading system that crosses said potential block.

2. A method as in claim 1, further comprising transmitting to said second trading system said contra order for execution against said aggregated one or more orders.

3. A method as in claim 1, wherein said one or more trading systems seek to identify one or more orders for said specific security that are available for aggregation into said potential block in response to at least one of:
   (a) a timer;
   (b) a market data analysis indicating presence of two-sided interest in said specific security;
   (c) confidential information about a standing order that has not crossed with other institutional liquidity;
   (d) information related to trade history that indicates a potential need for block liquidity in said specific security; and
   (e) confidential information from one or more order management systems indicating a potential need for block liquidity in said specific security.

4. A method comprising:
   receiving with a processing system comprising one or more processors data indicating that one or more orders of a specific size for a specific security are available in one or more securities trading systems;
   transmitting with said processing system data sufficient to enable a trading interface in communication with a first trading system to display an indication of the existence of said one or more orders and to indicate that said at least one or more of one or more orders originated from a second trading system in said one or more trading systems, said second trading system being separate from said first trading system; and
   receiving from said trading interface a contra order that crosses said one or more orders.

5. A method as in claim 4, further comprising transmitting to said second trading system said contra order for execution against said one or more orders.

6. A method as in claim 4, wherein said one or more trading systems seek to identify one or more orders of a specific size for a specific security that are available in one or more securities trading systems in response to at least one of:
   (a) a timer;
   (b) a market data analysis indicating presence of two-sided interest in said specific security;
   (c) confidential information about a standing order that has not crossed with other institutional liquidity;
   (d) information related to trade history that indicates a potential need for block liquidity in said specific security; and
   (e) confidential information from one or more order management systems indicating a potential need for block liquidity in said specific security.

7. A method comprising:
   receiving from a trading interface for a first trading system data describing a trading interest of a specific size and side in a security;
   notifying one or more systems, external to said first trading system, and comprising orders in said security of said trading interest, but not necessarily of said size and side;
   receiving with a processing system comprising one or more processors an indication from at least one of said external trading systems that one or more contra orders are available in said external trading systems for matching against said trading interest;
   transmitting with said processing system data sufficient to cause said trading interface to display an indication that said one or more contra orders are available for matching against said trading interest and that at least one of said one or more contra orders originated in said external trading systems;
   receiving from said trading interface instructions to execute said trading interest against said one or more contra orders; and
   transmitting a request to said at least one of said external trading systems to execute said trading interest against said one or more contra orders.

8. A method as in claim 7, wherein said trading interest is a block order in said security.

9. A computer system comprising:

one or more processors that receive data indicating that one or more orders for a specific security in one or more trading systems are available for aggregation into a potential block of at least a specific size;

one or more processors that transmit data sufficient to enable a trading interface in communication with a first trading system to display an indication of the existence of said potential block and that at least some orders in said block originated from a second trading system in said one or more trading systems, said second trading system being separate from said first trading system; and one or more processors that receive from said trading interface a contra order in said first trading system that crosses said potential block.

10. A non-transitory computer readable medium storing software that performs the method of claim 1.

* * * * *